(12) United States Patent
Oliver et al.

(10) Patent No.: US 7,010,503 B1
(45) Date of Patent: Mar. 7, 2006

(54) TRAFFIC REDUCTION IN NETWORKED DATA COLLECTION

(75) Inventors: Michael S. Oliver, Potomac Falls, VA (US); Alfred F. Pandolfi, Potomac Falls, VA (US)

(73) Assignee: AMS Services, Inc., Nashua, NH (US)

( * ) Notice: Subject to any disclaimer, the term of this patent is extended or adjusted under 35 U.S.C. 154(b) by 962 days.

(21) Appl. No.: 09/704,862

(22) Filed: Nov. 2, 2000

Related U.S. Application Data

(60) Provisional application No. 60/188,540, filed on Mar. 10, 2000.

(51) Int. Cl.
| | |
|---|---|
| G06F 17/60 | (2006.01) |
| G06F 15/00 | (2006.01) |
| G06F 17/00 | (2006.01) |
| G06F 17/21 | (2006.01) |
| G06F 17/24 | (2006.01) |
| G06F 3/00 | (2006.01) |
| G06F 9/00 | (2006.01) |
| G06F 15/16 | (2006.01) |

(52) U.S. Cl. .................. 705/26; 715/507; 715/780; 709/219

(58) Field of Classification Search ............... 345/780; 705/26, 27; 709/219; 715/505, 506, 507, 715/780
See application file for complete search history.

(56) References Cited

U.S. PATENT DOCUMENTS

| | | | | |
|---|---|---|---|---|
| 5,363,214 A | | 11/1994 | Johnson | 358/462 |
| 5,583,922 A | * | 12/1996 | Davis et al. | 379/93.09 |
| 5,634,052 A | | 5/1997 | Morris | 707/1 |
| 5,864,340 A | | 1/1999 | Bertram et al. | 345/780 |
| 5,880,724 A | * | 3/1999 | Bertram et al. | 345/780 |
| 5,968,125 A | * | 10/1999 | Garrick et al. | 709/224 |
| 6,049,877 A | * | 4/2000 | White | 713/201 |
| 6,128,653 A | * | 10/2000 | del Val et al. | 709/219 |

(Continued)

FOREIGN PATENT DOCUMENTS

EP        0585192 A1 *    3/1994

OTHER PUBLICATIONS

Anon., "Adobe Introduces Adobe Acrobat 3.0 Software," PR Newswire, Jun. 3, 1996.*

(Continued)

*Primary Examiner*—Nicholas D. Rosen
(74) *Attorney, Agent, or Firm*—Foley Hoag LLP

(57) ABSTRACT

Disclosed are a system, apparatus, and method for reducing traffic in networked data collection. When data collection is initiated, a server provides a page that includes data fields for completion by a user at the client. One or more of the data fields is configured to respond to changes by transmitting a new value to the server. The server may process the new value and return new data to the client, including an error message, an entry for another data field, or a plurality of entries and a control (e.g., drop-down list, scroll box). The data entry fields may also operate with one another (e.g., data is transmitted to the server only when two or more specific entries are changed). The server maintains an image of the entries so the server may process the entries without re-transmission of a completed form from the client.

25 Claims, 4 Drawing Sheets

U.S. PATENT DOCUMENTS

| | | | |
|---|---|---|---|
| 6,199,079 B1 * | 3/2001 | Gupta et al. | 715/507 |
| 6,366,920 B1 * | 4/2002 | Hoose et al. | 707/102 |
| 6,381,744 B1 * | 4/2002 | Nanos et al. | 725/24 |
| 6,385,642 B1 * | 5/2002 | Chlan et al. | 709/203 |
| 6,393,407 B1 * | 5/2002 | Middleton, III et al. | 705/14 |
| 6,405,238 B1 * | 6/2002 | Votipka | 709/203 |
| 6,463,343 B1 * | 10/2002 | Emens et al. | 700/83 |
| 6,490,601 B1 * | 12/2002 | Markus et al. | 715/507 |
| 6,510,430 B1 * | 1/2003 | Oberwager et al. | 707/10 |
| 6,538,667 B1 * | 3/2003 | Duursma et al. | 345/740 |
| 6,601,047 B1 * | 7/2003 | Wang et al. | 705/75 |
| 6,658,167 B1 * | 12/2003 | Lee et al. | 382/305 |
| 2001/0027420 A1 * | 10/2001 | Boublik et al. | 705/26 |
| 2001/0032092 A1 * | 10/2001 | Calver | 705/1 |
| 2001/0044792 A1 * | 11/2001 | Kikuchi et al. | 707/3 |
| 2002/0013788 A1 * | 1/2002 | Pennell et al. | 707/507 |
| 2002/0057295 A1 * | 5/2002 | Panasyuk et al. | 345/804 |
| 2002/0065879 A1 * | 5/2002 | Ambrose et al. | 709/203 |
| 2003/0212610 A1 * | 11/2003 | Duffy et al. | 705/26 |

OTHER PUBLICATIONS

Anon., "SPSS Unveils Aggressive Development Plans; 1999 Product Releases Will Focus on Scalability and Deployment Solutions for the Enterprise," Business Wire, Feb. 18, 1999.*

Gage, "Sun's 'Objective' Is to Populate Java Networks," Computer Reseller News, No. 679, p. 69, Apr. 15, 1996.*

Anon., "Internet Lifts Servers to 64 Bits," Electronic Engineering Times, p. 56, Dec. 23, 1996.*

Anon., "CoreData Inc. Announces Technology and Marketing Agreement with MobileStar Network Corp.," Business Wire, p. 8260131, Aug. 26, 1998.*

Anon., "CoreData Offers E-Mail Connectivity for RemoteWorx," Newsbytes News Network, Sep. 18, 1998.*

International Search Report Completed on Jun. 27, 2001 and Mailed on Jul. 4, 2001.

* cited by examiner

TRAFFIC REDUCTION IN NETWORKED DATA COLLECTION

RELATED APPLICATIONS

This application claims the benefit of U.S. Prov. App. No. 60/188,540, filed on Mar. 10, 2000 and entitled "Traffic Reduction in Networked Data Collection."

BACKGROUND OF THE INVENTION

1. Field of the Invention

This application relates to the field of networked data collection, and more particularly to traffic reduction in applications that collect data over a network.

2. Description of Related Art

A growing number of Internet businesses collect data from users, or clients, for processing at a server. User data may be required, for example, to book airline flights, to process product orders, to process subscriptions, and the like. The user data is transmitted to the server in some predetermined format, where the data is processed so that appropriate action may be taken.

Data gathering has been standardized somewhat, as in the <form> tags developed for the HyperText Markup Language ("HTML"). These tags provided a set of structured HTML tools for presenting data fields to a user in a form suitable for local display. Data field entries in such a form may be transmitted to the server for processing. As a significant disadvantage, such forms may be communicated between the server and the client only as integral units. For example, where the form includes several drop-down lists of options, all of these lists must be transmitted with the original form. If the form is returned to the server incomplete, the server will typically generate an error page, and optionally retransmit the entire form to the client.

This disadvantage is exacerbated where intermediate processing is required. For example, within a form for an airline reservation, a user may be asked to select flight options. The server may receive this information, and respond with a new form that includes flights from which the user may select. Although this information exchange takes place within a single client visit to a Web site, the transaction requires at least two consecutive HTML pages of forms, and may require additional pages and forms for options such as payment, mailing address, etc. Each form, each error message, and each intermediate processing step has associated therewith additional network traffic and overhead as additional HTML pages are generated and presented to a client.

There remains a need for a networked data collection system that reduces network traffic associated with data collection.

SUMMARY OF THE INVENTION

According to the principles of the invention, there is provided a system, apparatus, and method for reducing traffic in networked data collection. When data collection is initiated, a page is provided by a server to a client that includes a number of data fields for completion by a user at the client. One or more of the data fields is configured to respond to changes by transmitting a new value to the server. The server may process the new value and return new data to the client. The new data may include an error message, an entry for another data field, or a plurality of entries and a control (such as a drop-down list or scroll box), which may be included in selected ones of the data fields. The data entry fields may also operate in conjunction with one another such that, for example, data is transmitted to the server only when two or more specific entries are changed. The server maintains an image of the entries in the page, so that the server may process the entries without re-transmission of a completed form from the client.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF CERTAIN ILLUSTRATED EMBODIMENT(S)

To provide an overall understanding of the invention, certain illustrative embodiments will now be described, including a multi-tier client/server system for reducing network traffic during networked data collection. However, it will be understood by those of ordinary skill in the art that the methods and systems described herein can be suitably adapted to other systems that transfer data within a client/server relationship, such as application service provider systems or data sharing applications.

Figure 1:
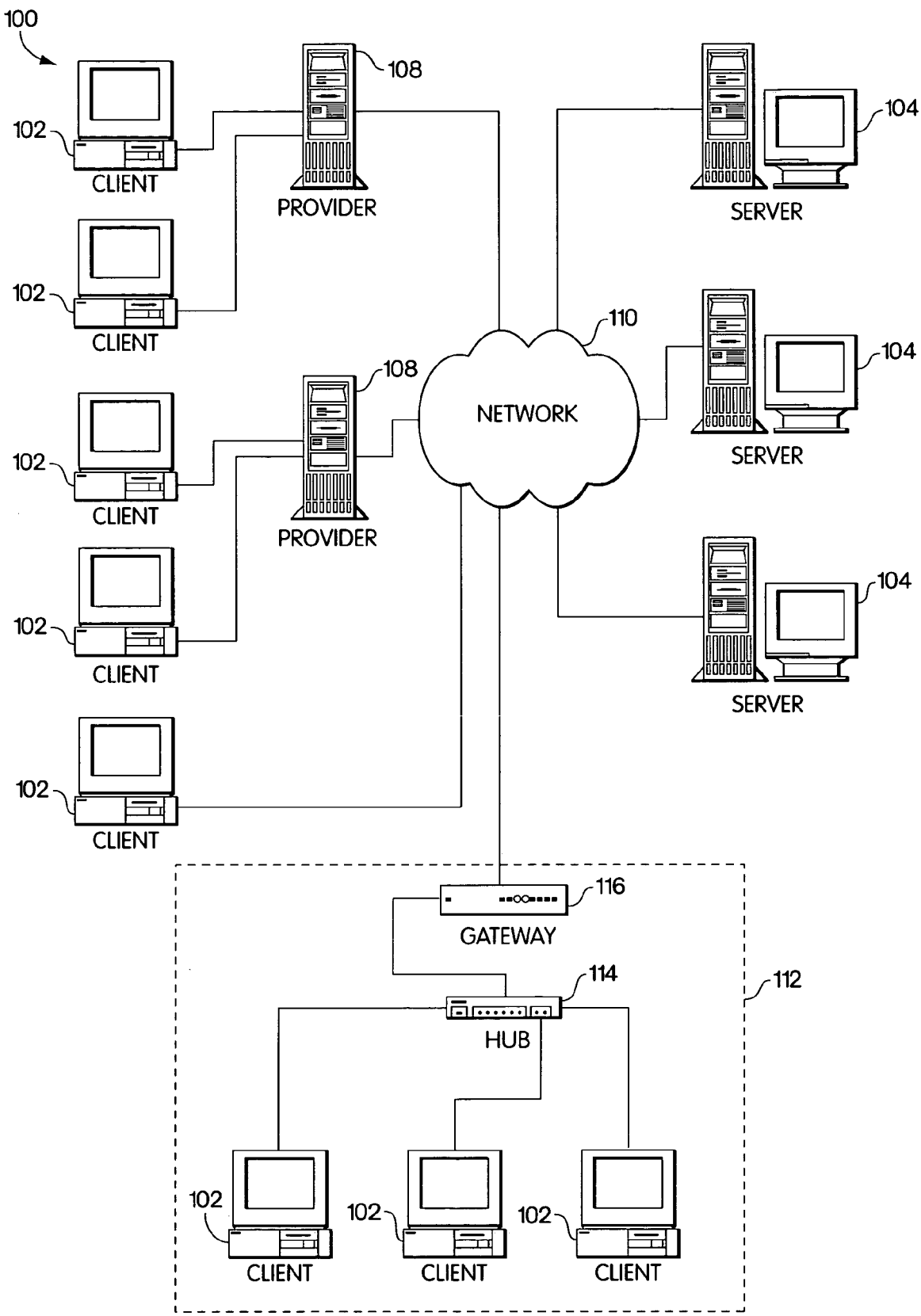
FIG. 1 is a block diagram of an internetwork used in an embodiment of a method and system disclosed herein.

FIG. 1 is a block diagram of an internetwork used in an embodiment of a method and system disclosed herein. In a system 100, a plurality of clients 102, servers 104, and providers 108 are connected via a network 110. It should be understood that any number of clients 102, servers 104, and providers 108 could participate in such a system 100. The system may further include one or more local area networks ("LAN") 112 that interconnect clients 102 through a hub 114 (in, for example, a peer network) or a local area network server 114 (in, for example, a client-server network). The LAN 112 may be connected to the network 110 through a gateway 116, which provides security to the LAN 112 and ensures operating compatibility between the LAN 112 and the network 110. Components of the internetwork 100 such as the providers 108, the gateway 116, and the hub 114, may be considered part of the network 110 interconnecting clients 102 and servers 104 in a communicating relationship.

In one embodiment, the network 110 is the Internet, and the World Wide Web provides a system for interconnecting clients 102 and servers 104 through the Internet 110. In other embodiments, the network 110 may be a virtual private network, a wide area network, a campus network, a corporate network, a personal area network (e.g., using Bluetooth, HomeRF, or some other short range wireless network protocol), or some combination of these networks. Any network architecture may be used, provided the network can support peer-to-peer networking, client/server networking, or some other communicating relationship between the entities described herein.

An exemplary client 102 includes the conventional components of a client system, such as a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as a modem, digital subscriber line ("DSL") card, cable modem, network interface card, wireless network card, or other interface device capable of wired, fiber optic, or wireless data communications. One example of such a client 102 is a personal computer equipped with an operating system such as Microsoft Windows 95, Microsoft Windows NT, or Unix and its variants, along with software support for Internet communication protocols. The personal computer may also include a browser program, such as Microsoft Internet Explorer or Netscape Navigator, to provide a user interface for access to the Internet 110. Although the personal computer is a typical client 102, the client 102 may also be a workstation, mobile computer, Web phone, television set-top box, interactive kiosk, personal digital assistant, or other device capable of communicating over the network 110. As used herein, the term "client" is intended to refer to any of the above-described clients 102, and the term "browser" is intended to refer to any of the above browser programs or other software or firmware that provides a user interface for navigating the network 110.

An exemplary server 104 includes a processor, a memory (e.g. RAM), a bus which couples the processor and the memory, a mass storage device (e.g. a magnetic or optical disk) coupled to the processor and the memory through an I/O controller, and a network interface coupled to the processor and the memory. Servers may be clustered together to handle more client traffic, and may include separate servers for different functions such as a database server, an application server, and a Web presentation server. Several logical servers may also reside on a single physical server machine. Servers may further include one or more mass storage devices such as a disk farm or a redundant array of independent disk ("RAID") system for additional storage and data integrity. Read-only devices, such as compact disk drives and digital versatile disk drives, may also be connected to the servers. Suitable servers and mass storage devices are manufactured by, for example, Compaq, IBM, and Sun Microsystems. As used herein, the term "server" is intended to refer to any of the above-described servers 104.

Focusing now on the network 110, the presently preferred embodiment is the Internet. The structure of the Internet 110 is well known to those of ordinary skill in the art and includes a network backbone with networks branching from the backbone. These branches, in turn, have networks branching from them, and so on. The backbone and branches are connected by routers, bridges, switches, and other switching elements that operate to direct data through the network 110. For a more detailed description of the structure and operation of the Internet 110, one may refer to "The Internet Complete Reference," by Harley Hahn and Rick Stout, published by McGraw-Hill, 1994. However, one may practice the present invention on a wide variety of communication networks. For example, the network 110 can include interactive television networks, telephone networks, wireless data transmission systems, two-way cable systems, customized computer networks, interactive kiosk networks and automatic teller machine networks. As used herein, the term "network" is intended to refer to the Internet, or any other network or internetwork suitable for transmitting data among servers and clients.

One embodiment of the network 110 includes Internet service providers 108 offering dial-in service, such as Microsoft Network, America OnLine, Prodigy and CompuServe. It will be appreciated that the Internet service providers 108 may also include any computer system which can provide Internet access to a client 102. Of course, the Internet service providers 108 are optional, and in some cases, the clients 102 may have direct access to the Internet 110 through a dedicated DSL service, ISDN leased lines, T1 lines, digital satellite service, cable modem service, or any other high-speed connection. Any of these high-speed services may also be offered through one of the Internet service providers 108.

In its present deployment as the Internet 110, the network 110 consists of a worldwide computer network that communicates using the well-defined Transmission Control Protocol ("TCP") and Internet Protocol ("IP") to provide transport and network services. Computer systems that are directly connected to the Internet 110 each have a unique IP address. The IP address consists of four one-byte numbers (although a planned expansion to sixteen bytes is underway with IPv6). The four bytes of the IP address are commonly written out separated by periods such as "63.89.2.8". To simplify Internet addressing, the Domain Name System ("DNS") was created. The DNS allows users to access Internet resources with a simpler alphanumeric naming system. A DNS name consists of a series of alphanumeric names separated by periods. For example, the name "www.amsworld.com" corresponds to a particular IP address. When a domain name is used, the computer accesses a DNS server to obtain the explicit four-byte IP address.

To further define the resources on the Internet 110, the Uniform Resource Locator system was created. A Uniform Resource Locator ("URL") is a descriptor that specifically defines a type of Internet resource along with its location. URLs have the following format: resource-type://domain-.address/path-name where resource-type defines the type of Internet resource. Web documents are identified by the resource type "http" which indicates that the hypertext transfer protocol should be used to access the document. Other common resource types include "ftp" (file transmission protocol), "mailto" (send electronic mail), "file" (local file), and "telnet." The domain.address defines the domain name address of the computer that the resource is located on. Finally, the path-name defines a directory path within the file system of the server that identifies the resource. As used herein, the term "IP address" is intended to refer to the four-byte Internet Protocol address, and the term "Web address" is intended to refer to a domain name address, along with any resource identifier and path name appropriate to identify a particular Web resource. The term "address," when used alone, is intended to refer to either a Web address or an IP address.

In an exemplary embodiment, a browser, executing on one of the clients 102, retrieves a Web document at an address from one of the servers 104 via the network 110, and displays the Web document on a viewing device, e.g., a screen. A user can retrieve and view the Web document by entering, or selecting a link to, a URL in the browser. The browser then sends an http request to the server 104 that has the Web document associated with the URL. The server 104 responds to the http request by sending the requested Web document to the client 102. The Web document is an HTTP object that includes plain text (ASCII) conforming to the HyperText Markup Language ("HTML"). Other markup languages are known and may be used on appropriately enabled browsers and servers, including the Dynamic HyperText Markup Language ("DHTML"), the Extensible Markup Language ("XML"), the Extensible Hypertext Markup Language ("XHTML"), the Vector Markup Language ("VML"), and the Standard Generalized Markup Language ("SGML").

Each Web document usually contains hyperlinks to other Web documents. The browser displays the Web document on the screen for the user and the hyperlinks to other Web documents are emphasized in some fashion such that the user can identify and select each hyperlink. To enhance functionality, a server 104 may execute programs associated with Web documents using programming languages such as CGI, Perl, PHP, C, C++, or Java. These programs perform "back-end" functions such as order processing, database management, and content searching. A Web document may also include references to small client-side applications, or applets, that are transferred from the server 104 to the client 102 along with a Web document and executed locally by the client 102. Java is one popular example of a programming language used for applets. The text within a Web document may further include (non-displayed) scripts that are executable by an appropriately enabled browser, using a scripting language such as JavaScript or Visual Basic Script. Browsers may further be enhanced with a variety of helper applications to interpret various media including still image formats such as JPEG and GIF, document formats such as PS and PDF, motion picture formats such as AVI and MPEG, and sound formats such as MP3 and MIDI. These media formats, along with a growing variety of proprietary media formats, may be used to enrich a user's interactive and audio-visual experience as each Web document is presented through the browser. The term "page" as used herein is intended to refer to a Web document as described above, as well as any of the above-described functional or multimedia content associated with the Web document.

In operation, a client 102 accessing an address hosted by a server 104 may receive a page from the server 104 containing text, forms, scripts, active objects, hyperlinks, etc., which may be collectively viewed using a browser. Each page may consist of static content, i.e., an HTML text file and associated objects (*.avi, *.jpg, *.gif, etc.) stored on the presentation server, and may include active content including applets, scripts, and objects such as check boxes, drop-down lists, and the like. A page may be dynamically created in response to a particular client 102 request, including appropriate queries to a database for particular types of data to be included in a responsive page. It will be appreciated that accessing a page is more complex in practice, and includes, for example, a DNS request from the client 102 to a DNS server, receipt of an IP address by the client 102, formation of a TCP connection with a port at the indicated IP address, transmission of a GET command to the server 104, dynamic page generation (if required), transmission of an HTML object, fetching additional objects referenced by the HTML object, and so forth.

In an embodiment of the invention, one of the clients is a personal computer using Internet Explorer 5 as a web browser. One of the servers operates as a web server based upon the Microsoft Windows NT operating system and Microsoft Active Server Pages. The web server communicates with application logic using the Microsoft's Distributed Component Object Model ("DCOM").

Figure 2:
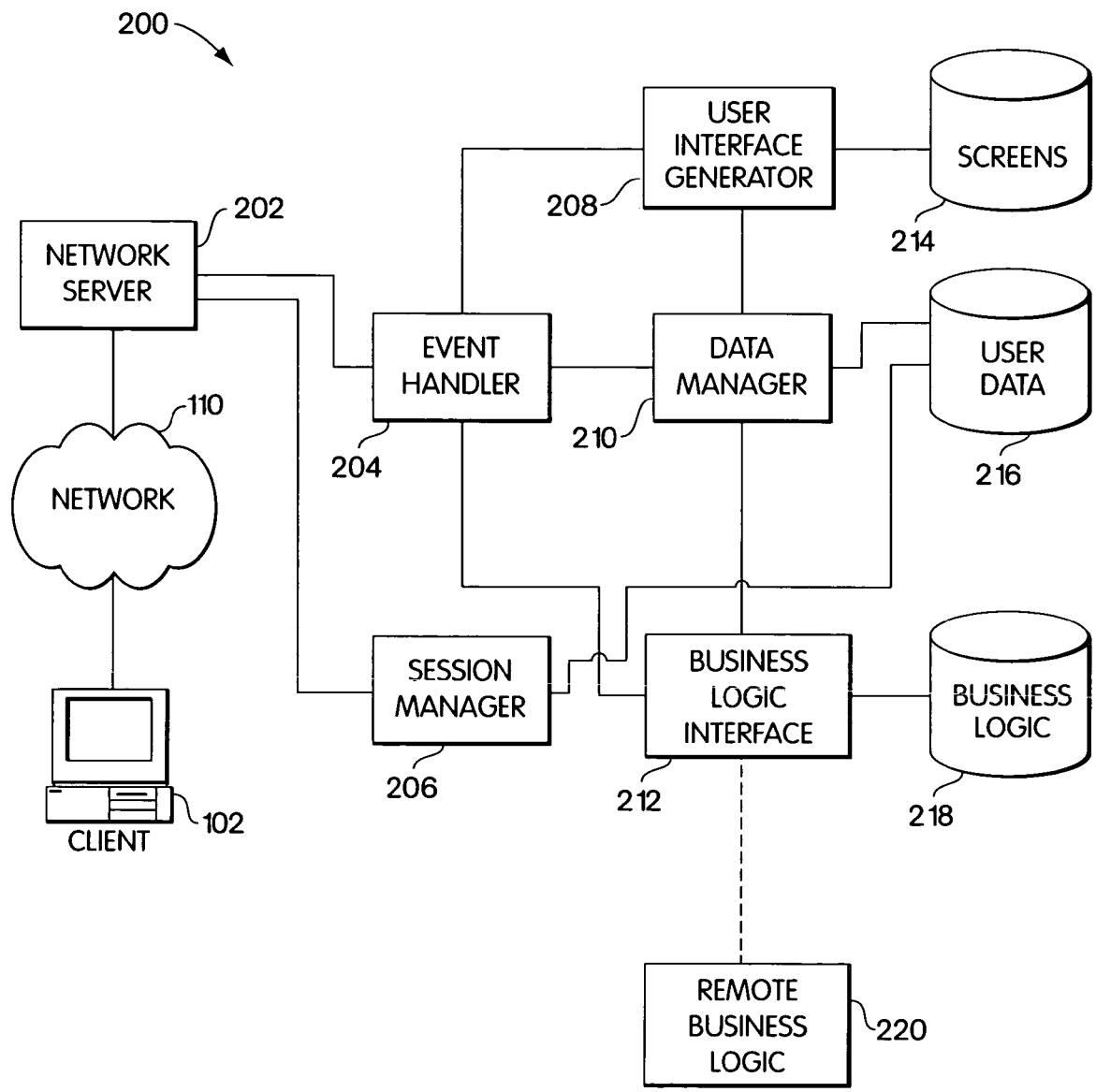
FIG. 2 is a block diagram of an application architecture using the internetwork of FIG. 1.

FIG. 2 is a block diagram of an application architecture using the internetwork 100 of FIG. 1. The application architecture 200 includes a network server 202, such as the server 104 of FIG. 1, for maintaining a connection with the client 102 over the network 110. The network server 202 communicates with an event handler 204 and a session manager 206. To process client requests, the event handler 204 communicates with a user interface generator 208, a data manager 210, and a business logic interface 212. A screens database 214, a user data database 216, and a business logic database 218 are included to store data relating to the application that uses the application architecture 200. It will be appreciated that each of the components above may reside on a single physical device, or on several devices, which may distributed or clustered, or otherwise scaled for suitable capacity to meet a number of clients 102 being served. It will further be appreciated that each component may be implemented in hardware, software, or some combination of these. In an embodiment, each of the above components of the application architecture 200 are implemented in the C++ programming language. The databases 214, 216, 218 may be implemented using, for example, an SQL compatible relational database.

The network server 202 performs server functions generally known in the art, including maintaining communications with one or more clients 102, and providing any protocol stacks suitable to communication over the network 110. The network server 202 may also provide functions such as client management, according to client information (such as an authorized user list) stored on the network server 202, or in a database associated with the network server 202. The session manager 206 may also be any session manager known to those skilled in the art for maintaining and tracking sessions, or 'visits', of particular clients. Information used by the session manager 206 may be stored in the user data database 216. In one embodiment, the network server 202 handles client requests using remote scripting such as Microsoft Active Server Pages, and communicates with the event handler 204 and the session manager 206 using DCOM calls.

The event handler 204 responds to events forwarded from the network server 202. Events may be generated by the client 102, or by the network server 202 in response to a client action. The event handler 204 may respond to two general types of events: generic events and business logic interface events. Generic events may be known client/server events, such as logon, logoff, navigate to a page, etc. Other events may be handled without reference to the business logic interface 212 such as a "position" event. The position event may cause the event handler to access the data manager 210 and return a different data collection page to the client 102, as specified by the position event. The position event permits the client 102 to switch between views of two or more different data point sets without navigating to a new HTML page.

Business logic interface ("BLI") events are events defined by the business logic interface 212 and the business logic database 218. BLI events may be signaled to the event handler 204 through a naming convention, such as BLI_eventname, where eventname is the name of a defined event. In an embodiment of the invention, the BLI 212 is instantiated as a COM object, and includes a register of defined events, so that the BLI 212 may either apply appropriate business logic to an event, or return an error message to the event handler 204 indicating that the event is not recognized.

The user interface generator 208 responds to navigation events from the event handler 204. A navigation event may be an event initiated by the client 102 that requests a specific page. In response, the user interface generator 208 retrieves the requested page from the screens database 214, or generates an error message if no responsive page is available. The pages stored in the screens database 214 may include introductory pages, information pages, and the like. The pages stored in the screens database 214 may also include page profiles used by the user interface generator 208 to dynamically generate pages using information provided by the client 102, and possibly information available from the data manager 210.

A data collection page may be provided by the screens database 214 and the user interface generator 208. The data collection page may be provided to the client 102 in response to, for example, a request from the client 102 for which further processing requires data collection from the client 102, or from a user at the client 102.

In one embodiment of the invention, the data collection page includes a form that may be interpreted for display by the browser on the client 102, along with JavaScript functions to assist in data collection. The data collection page includes a number of "data points," which are data fields that may be functionally linked to various events and/or variables, or to each other. As will be explained more fully below, each data point may have a corresponding, locally stored, JavaScript value, which may be a single text or numeric value, or a number of values, presented along with a control, such as a drop-down list, one or more checkboxes, one or more radio buttons, a scroll box, and so forth. The client 102 uses the JavaScript functions to process changes to the data points and, where appropriate, make remote scripting calls to the network server 202 and the event handler 204.

For example, an input function may be provided, the function being called whenever a value of a data point changes. The input function may validate the changed value, i.e., ensure that the changed value is correctly formatted for the data point, and locally store the changed value in a JavaScript variable. The input function may also be called whenever a selection is changed in a data point having a control. It will be appreciated that different input functions may be provided for different data points. For example, separate input functions may be provided for data points that have controls and data points that have only an input field. The input function, or an additional function, may examine the changed value to determine whether a call to the event handler 204 is appropriate. This determination is made by client-side logic, and may be absolute (i.e., call the event handler 204 whenever the data point changes) or dependent on some other condition, such as the new value of the data point, or the values of other data points. A call to the event handler 204 may also depend on, for example, a change to any of several related data points, or a change to all of a group of related data points.

An event-handler function is called when access to the event handler 204 is appropriate in response to a changed value. The event-handler function provides a label, along with the changed value (or values), and transmits this information as an event to the event handler 204, through the network server 202. The event-handler function also receives a return value from the event handler 204, which may include JavaScript script to set local variable values (i.e., one or more data points) and may also include JavaScript script to insert one or more controls, such as drop-down lists, along with a selectable list of values, into the data collection page.

As an example of the above, an automobile dealer may offer automobiles for sale using the application architecture 200 described above. In order to determine local availability at the client location, an auto sale data collection page may be provided that includes a drop-down list of states. When a state is selected by the client 102, the state selection is transmitted to the event handler 204 as an event. The event handler 204, through the BLI 212 (as will be explained in further detail below), may respond with a drop-down list control, along with a number of values including names of towns within the state that may be selected using the drop-down list. The event handler 204 response includes a reference to a "town" container in the auto sale data collection page, so that the client 102 may place the drop-down list of selections into the correct location on the page. Similar functionality may be provided for, for example, zip codes, area codes, phone numbers, street names, counties, and so forth. Further, the functionality may be bi-directional between data points. In other words, a zip code selection may result in a specific state and town selection, while a town selection may result in a specific zip code selection. In another example, an online shopping environment may be presented where a user specifies a price at the client 102 and one or more conforming goods are provided to the client 102 from the network server 202. Each of these data collection steps is achieved while transmitting only the data point selections, along with any controls and overhead (e.g., a target data point), over the network 110. More generally, complex and/or data-intensive business logic may be realized on the client side of a data collection session, while reducing network traffic between the client 102 and the network server 202.

During a data collection session, the data manager 210 may store an image of data points on the data collection page. Thus, the event handler 204 and the business logic interface 212 will not be required to fetch data points from the client 102 each time additional processing is required. Further, the data manager 210 may manage a number of alternative data point sets in the user data database 216, allowing a user at the client 102 to maintain more than one data collection page during a data collection session. In this case, a client navigation to a previously completed, or partially completed, data collection page may cause the data manager 210 to repopulate the page with the data points last provided by the client 102.

The data manager 210 may also modify the data point image, pursuant to instructions from the business logic interface 212, in which case the data manager 210 may communicate the modifications to the client 102. For example, if the business logic interface 212 determines that a value for a data point is too large, in response to a change in another data point, the business logic interface 212 may update the data point image according to any suitable algorithm, as well as any corresponding client-side data points, through the data manager 210. The data manager 210 may also spawn a number of alternative data point sets from a data point image where, for example, different selections for a data point are simultaneously indicated by the client 102, such as where one of the controls provided in the data collection page includes a number of non-exclusive checkboxes.

For a particular implementation of the application architecture 200, the data manager 210 may include entities such as a data model, a table, a view set, a view, a field, and a data point. The data model defines the physical storage structure for an object, such as a quote being provided by the application architecture 200 to a client 102. Each table defines fields that hold data associated with a particular object, such as a particular quote. The view set defines a logical view of the data model, that is, the manner in which the data model is to be presented to a client. The view defines a logical view of a particular table. The field defines a physical storage location for a single field of data associated with an object. The data point defines a logical view of a field, that is, the manner in which the field is to be presented to a client. Using these entities, a data collection page may be fully defined within the data manager 210.

The data manager 210 may provide additional functionality associated with a scalable architecture. For example, the data manager 210 may expire a view set. The data manager 210 may provide information on all data models supported by the application architecture 200. The data manager 210 also provides functions for accessing and updating particular fields or data points within particular objects, e.g., the quotes mentioned above, as well as creating new data points. The data manager 210 may also include functions to insert, inspect, and remove checkpoints in view sets, such that the data point image in a view set may be synchronized with data points at a client 102. The data manager 210 may also provide any other function consistent with the management of data structures that may be associated with the application architecture 200, or specific applications deployed thereon.

The business logic interface ("BLI") 212 receives events from the event handler 204 that are labeled as BLI events. The BLI 212 may be configured as a Component Object Model ("COM") module, including a container object and one or more BLI objects. The container object provides information about the BLI objects of the module, and includes a register which may be queried at registration time. Each BLI object also includes a discover interface which may also be queried to obtain information about the BLI object. Information provided by the discover interface may include information such as a name and identifier of the BLI object, data points used by the BLI object, a list of BLI events supported by the BLI object, and descriptive information about the BLI object.

Each BLI object of a BLI module may also include a process interface that includes a function that may be called to process an event. A call to the process interface includes an event (or an array of multiple events) along with a parameter list, such as data points used by the process interface. The process interface applies business logic, which may be any algorithm implemented in a programming language such as C++, and returns a result. The result returned by the process interface may be transmitted to the client 102 as, for example, script or HTML. The result may instead include an additional event, which is addressed by the event handler 204, so that more complex event handling may be constructed from more atomic business logic components. The business logic used by the process interface may be stored in the business logic database 218.

The business logic database 218 stores elements of business logic. This may include, for example, business logic to support data collection during changes to data points. For example, if automobile data is being collected, a user at the client 102 may first select a make, such as Ford. The data point for automobile make responds to this change, as described above, by generating an event which is transmitted to the BLI 212 through the network server 202 and the event handler 204. In response, the BLI 212 may query the business logic database 218 for models associated with the specified make. The business logic database 218 may respond with a list of models known for the make, such as Taurus, Escort, Ranger, etc., and may include with this list a control for making a selection, such as a drop-down list. The drop-down list, available selections, and optionally, a pre-selected first choice, are provided as a response to the client 102 for insertion into the data collection page. The list may further be sorted according to some predetermined criteria, such as alphabetically, or by popularity of different models. This response may be a JavaScript script that uses the JavaScript functions defined in the data collection page and residing on the client 102. The response may also be other code for interpretation by the client 102, such as dialog boxes, alerts, or new HTML code. Data collection may proceed in this manner for additional data. In the automobile example above, this may include data such as a year of manufacture, an engine type, option packages, color, etc.

The business logic database 218 may also include algorithms relating to business logic, such as algorithms for estimating or establishing value of a product, selecting products that match one or more user-provided criteria, and so on. For example, a home mortgage originator may have one or more loans available for borrowers. Once borrower data has been collected using the above data collection system, a maximum loan value may be calculated using rules and formulas established by the originator. Application of these rules and formulas may be implemented in a programming language, such as C++, and stored in the business logic database 218 for access by the BLI 212. As noted above, maintaining business logic on the server side of the network 110, along with an image of data points, permits complex business logic to be implemented in a networked environment while reducing traffic over the network between the client 102 and the network server 202.

In an embodiment of the invention, the business logic interface 212 may periodically access a remote business logic unit 220. For example, where the application architecture 200 is configured to provide price quotations for products or services from an independent provider, the independent provider may establish the remote business logic unit 220 so that business logic interface 212 can access current information of the independent provider. Current information may include rate updates, new restrictions on service offerings, or the like. More generally, the application architecture 200 may be configured to generate a message to the remote business logic unit 220 when a sale is about to made, so that the remote business logic unit 220 may indicate any additional information required before the sale, or authorize the sale as requested. It will be appreciated that communication and data transfer between the BLI 212 and the business logic unit 220 may be through the network server 202 and the network 110, or through some private communication link.

Figure 3:
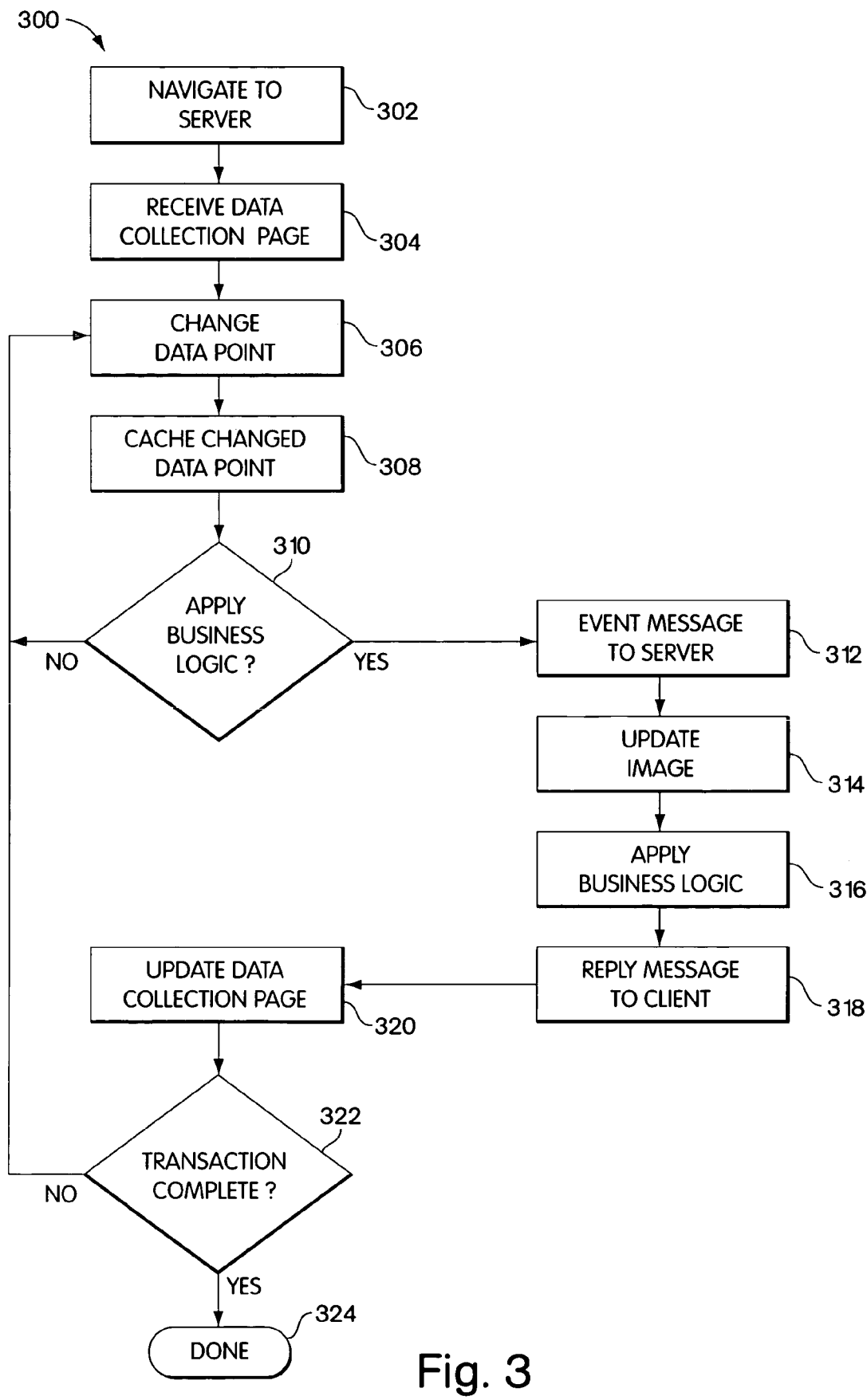
FIG. 3 is a flow chart showing data collection according to the principles of the invention.

FIG. 3 is a flow chart showing data collection according to the principles of the invention. A data collection process 300 begins when the client 102 navigates to the network server 202, or more particularly, to a specific page served by the network server 202, over the network 110, as shown in step 302. This may include an HTTP access request to the network server 202, as described above. The network server 202 may respond to the access request by providing a data collection page, such as the data collection page described above.

As shown in step 306, the data collection page responds to changes in data points. When a data point change is detected, the changed data point is cached, as shown in step 308. Where JavaScript is used, this may include storing the data point value into a local JavaScript variable.

As shown in step 310, a determination is made on the client side of whether business logic should be applied. In particular, the code accompanying the data collection page includes code to detect changes in the data points, and to determine, for each changed data point, whether access to apply business logic of the BLI 212. If no business logic is required at the client 102, then the process 300 returns to step 306 where an additional data point may be input by the user. It will be appreciated that user input of a data point may be recognized by the data collection page through a tab key, which transfers the user to a next data point, or any other control as may be known in the art to recognize leaving a data entry field.

If business logic should be applied, then an event message is generated and communicated from the client 102 to the network server 202, as shown in step 312. The event message may include the changed data point and an event name for communication to the BLI 212.

As shown in step 314, the event handler 204 may update an image of the data collection page by suitable instruction to the data manager 210. The event handler 204 also forwards the event to the BLI 212, as shown in step 316. The BLI 212 may query the business logic database 218 to obtain any needed business logic, and processes the event.

As shown in step 318, a reply message is generated for the client 102, which may include values for data points, along with suitable controls for selecting values of data points, and other functional code as may be appropriate for presentation within the data collection page. As shown in step 320, the data collection page is updated according to the contents of the reply message.

As shown in step 322, a determination is made whether the transaction relating to the data collection page is complete. For example, where the transaction is a request for an insurance quote, the transaction is complete when the user at the client 102 has provided all of the information needed by the BLI 212 to provide a quote to the user. At this point, the user may request insurance according to the quote, and the client 102 may navigate away from the data collection page, as shown in step 324, and the client may navigate to an additional page where the insurance is purchased. It will be appreciated that the information stored locally at the client 102, or the image of the data points in the data collection page stored by the data manager 210, may be displayed within an insurance purchase page.

Figure 4:
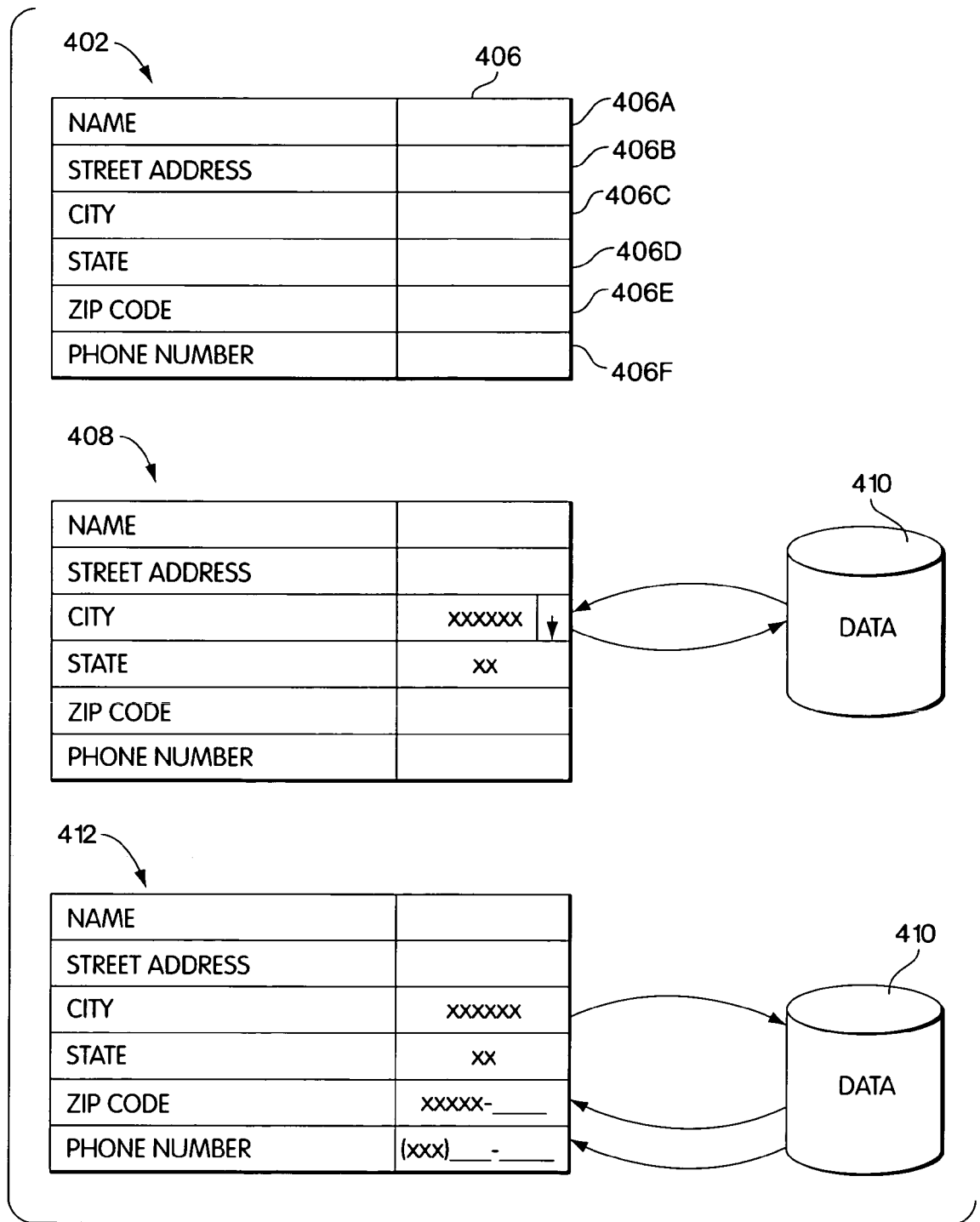
FIG. 4 depicts a user interface during data collection process according to the invention.

FIG. 4 depicts a user interface including data collection according to the principles of the invention. As shown in FIG. 4, an interface 402 includes one or more data points 406. Data points may include, for example, a name 406A, a street address 406B, a city 406C, a state 406D, a zip code 406E, a phone number 406F, and so forth. Although shown in tabular format, it will be appreciated that data points 406, including the accompanying text, may be presented in any manner, such as a manner suitable for display as a Web form or Web page.

As shown in the interface 408, when a user modifies a data point 406, such as by typing in a two letter state code into the state data point 406D, this data is transmitted to a database 410 using, for example, the architecture described above. As indicated by arrows, the database 410 may return data for one or more other data points 406, for example, a list of cities in the indicated state, and a drop-down list control for selecting one of the cities. As further shown in the interface 412, when a user specifies the city, additional data may be provided for one or more data points 406. For example, a zip code may be returned from the database 410, with additional characters added by the user for a zip code extension, or, where a city contains a number of zip codes, a drop-down list or other control may be provided by the database 410, along with a list of zip codes to select from. At the same time, a portion of a phone number may be automatically completed, such as an area code or an exchange number. Additional logic may be provided so that, for example, a new zip code entry may change or clear city, state, and phone number data points, or may generate a separate error message for display in the interface indicating that an invalid selection has been made. The database 410 may also store an image of data entered into the data points 406 of the user interface.

It will be appreciated that different combinations of data points 406, and different relationships between data points 406, may be provided, and are intended to fall within the scope of this disclosure. For example, when a phone number is provided to the user interface, a remote database may be queried, for example, through the business logic interface 212, and a number of data points 406 may be pre-filled with data for an individual associated with that phone number. Furthermore, using remote business logic as described above, a current version of the data points 406 stored on the server-side of a data collection process may be periodically forwarded to a remote system for analysis and, where appropriate, the remote system may respond with requests for additional data from the device that presents the user interface 402.

In an example embodiment, the user interface 402 may be used to collect data for an automobile insurance quotation. The interface 402 may include one or more sequential screens of display, and may provide data points for a number of items pertaining to an insurance quotation. Relevant data points may include a name, an address, an identification of any other vehicle operators, an insured vehicle make, model, year, identification number and so forth, specific types of coverage and amounts of coverage for each type, theft prevention devices.

While the invention has been disclosed in connection with the preferred embodiments shown and described in detail, various modifications and improvements thereon will become readily apparent to those skilled in the art. The system may be used, for example, to conduct an online purchase of any good or service, particularly goods or services that may be specified by a user within predefined data fields. Accordingly, the spirit and scope of the present invention is to be limited only by the following claims.

What is claimed is:

1. A method for data collection in a client/server environment, the method comprising:
   providing a form to a client for display by the client, the form including a plurality of data entry fields;
   providing a script to the client, the script detecting a change to one of the plurality of data entry fields, and in response to the detected change, transmitting a first message over a data network from the client to a server, the first message including information indicative of the detected change; and
   transmitting a second message over the data network from the server to the client, in response to the first message, the second message including data relating to a different one of the plurality of data entry fields.

2. The method of claim 1, further comprising providing a plurality of scripts to the client, each script detecting a change to one or more of the plurality of data entry fields, and in response to the detected change, transmitting an additional message over the data network from the client to the server.

3. The method of claim 1 wherein the plurality of data entry fields represent data required to complete a transaction.

4. The method of claim 3 wherein the plurality of data entry fields include a data field for at least one of a name, an address, a town, a state, a zip code, an area code, a phone number, a street name, a county, an automobile make, an automobile model, an automobile year of manufacture, an engine type, an option package, a color, a vehicle identification number, vehicle operators, a type of insurance coverage, an amount of insurance coverage, and a price.

5. The method of claim 3 wherein the transaction includes at least one of booking an airline flight, processing a subscription, purchasing an automobile, applying for a mortgage, or requesting an insurance quote.

6. The method of claim 1 wherein the second message includes a control, the control defining how a user input corresponding to the different one of the plurality of data entry fields will be accepted.

7. The method of claim 1, further comprising storing an image of data contained in the plurality of data entry fields.

8. The method of claim 1, further comprising generating the second message by applying business logic maintained on the server.

9. The method of claim 1 further comprising generating the second message by applying remote business logic maintained at a remote server, the remote server connected in a communicating relationship with the server.

10. A system for data collection in a network, the system comprising:
a form providing means for providing a form to a client for display by the client, the form including a plurality of data entry fields;
a script providing means for providing a script to the client, the script detecting a change to one of the plurality of data entry fields, and in response to the detected change, transmitting a first message over a data network from the client to a server, the first message including information indicative of the detected change; and
transmitting means for transmitting a second message over the data network from the server to the client, in response to the first message, the second message including data relating to a different one of the plurality of data entry fields.

11. The system of claim 10, the second message including a control, the control providing a user interface for entering data into said different one of the plurality of data entry fields.

12. The system of claim 10 wherein the network includes the Internet.

13. The system of claims 10 wherein the network includes at least one of a local area network, a virtual private network, a wide area network, a corporate area network, or a personal area network.

14. The system of claims 10 wherein the client is at least one of a personal digital assistant, a personal computer, a workstation, a mobile computer, a Web phone, a television set-top box, and an interactive kiosk.

15. The system of claim 10 wherein the server includes a business logic interface for generating responses to one or more predetermined events.

16. The system of claim 15, wherein the business logic interface includes a connection to a remote business logic unit.

17. The system of claim 10, wherein the server includes a database, the server storing data in one or more data fields of the displayed form in the database.

18. A computer-readable medium containing a computer-implementable program for data collection in a client/server environment, the computer program comprising computer-implementable instructions for controlling a computer to:
provide a form for display by a client, the form including a plurality of data entry fields;
detect a change to one of the plurality of data entry fields, and in response to the detected change, transmits a first message over a data network from the client to a server, the first message including information indicative of the detected change; and
transmit a second message over the data network from the server to the client, in response to the first message, the second message including data relating to a different one of the plurality of data entry fields.

19. The computer-readable medium of claim 18, wherein the plurality of data entry fields represent data required to complete a transaction.

20. The computer-readable medium of claim 19 wherein the transaction includes at least one of booking an airline flight, processing a subscription, purchasing an automobile, applying for a mortgage, or requesting an insurance quote.

21. The computer-readable medium of claim 18 wherein the plurality of data entry fields include a data field for at least one of a name, an address, an address, a town, a state, a zip code, an area code, a phone number, a street name, a county, an automobile make, an automobile model, an automobile year of manufacture, an engine type, an option package, a color, a vehicle identification number, vehicle operators, a type of insurance coverage, an amount of insurance coverage, and a price.

22. The computer-readable medium of claim 18 wherein the second message includes a control, the control defining how a user input corresponding to the different one of the plurality of data entry fields will be accepted.

23. The computer-readable medium of claim 18, further comprising computer-implementable instructions for controlling a computer to store executable code that stores an image of data contained in the plurality of data entry fields in a database.

24. The computer-readable medium of claim 18, further comprising computer-implementable instructions for controlling a computer to generate the second message by applying business logic maintained on the server.

25. The computer-readable medium of claim 18, further comprising computer-implementable instructions for controlling a computer to generate the second message by applying remote business logic maintained at a remote server, the remote server connected in a communicating relationship with the server.

* * * * *